(12) United States Patent
Marchini et al.

(10) Patent No.: US 10,589,483 B2
(45) Date of Patent: Mar. 17, 2020

(54) PROCESS AND DRUM FOR LOOPING ANNULAR ANCHORING STRUCTURES IN A PROCESS FOR BUILDING TYRES FOR VEHICLE WHEELS

(71) Applicant: PIRELLI TYRE S.P.A., Milan (IT)

(72) Inventors: Maurizio Marchini, Milan (IT); Henrique Scarmagnan Saraiva, Milan (IT); Marco Lepore, Milan (IT); Christian De Col, Sedico (IT)

(73) Assignee: PIRELLI TYRE S.p.A., Milan (IT)

( * ) Notice: Subject to any disclaimer, the term of this patent is extended or adjusted under 35 U.S.C. 154(b) by 357 days.

(21) Appl. No.: 15/128,596

(22) PCT Filed: Mar. 23, 2015

(86) PCT No.: PCT/IB2015/052105
§ 371 (c)(1),
(2) Date: Sep. 23, 2016

(87) PCT Pub. No.: WO2015/145327
PCT Pub. Date: Oct. 1, 2015

(65) Prior Publication Data
US 2017/0173906 A1    Jun. 22, 2017

(30) Foreign Application Priority Data

Mar. 24, 2014    (IT) .............................. MI2014A0489

(51) Int. Cl.
*B29D 30/50*    (2006.01)
*B29D 30/48*    (2006.01)
(Continued)

(52) U.S. Cl.
CPC ............. *B29D 30/50* (2013.01); *B29D 30/18* (2013.01); *B29D 30/32* (2013.01); *B29D 30/48* (2013.01);
(Continued)

(58) Field of Classification Search
CPC .... B29D 30/18; B29D 30/245; B29D 30/247; B29D 30/32; B29D 30/36; B29D 30/48;
(Continued)

(56) References Cited

U.S. PATENT DOCUMENTS 1,759,669 A    5/1930 Stevens
1,944,768 A *  1/1934 Stevens ................. B29D 30/50
                                                        156/136

(Continued)

FOREIGN PATENT DOCUMENTS

DE            26 45 178        4/1978
DE       10 2008 032 382       12/2009
(Continued)

OTHER PUBLICATIONS

Machine generated English language translation of DE 102011050142 (original document dated Nov. 2012) (Year: 2012).*
(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

A process and a drum for looping annular anchoring structures in a process for building tyres for vehicle wheels includes: depositing a loop on a drum including a radially expandable/contractible intermediate annular portion and, in a position axially adjacent to the opposite axial ends of the intermediate annular portion, a pair of radially expandable/contractible lateral annular portions; associating an annular anchoring structure with a radially outer annular surface portion of the loop defined at the intermediate annular portion; and turning up each of opposite end edges of the loop on the annular anchoring structure through the lateral annular portions as a result of a thrusting stress imparted by (Continued)

a respective lateral annular portion of the pair of lateral annular portions because of a synchronous radial movement and a synchronous axial displacement of a respective plurality of circumferentially adjacent first angular sectors.

13 Claims, 8 Drawing Sheets

(51) Int. Cl.
*B29D 30/18* (2006.01)
*B29D 30/32* (2006.01)
*B29D 30/24* (2006.01)
*B29D 30/36* (2006.01)

(52) U.S. Cl.
CPC .......... *B29D 30/245* (2013.01); *B29D 30/247* (2013.01); *B29D 30/36* (2013.01); *B29D 2030/325* (2013.01); *B29D 2030/482* (2013.01); *B29D 2030/486* (2013.01); *B29D 2030/487* (2013.01)

(58) Field of Classification Search
CPC ............ B29D 30/50; B29D 2030/3214; B29D 2030/3235; B29D 2030/325; B29D 2030/482; B29D 2030/486; B29D 2030/487; B29D 30/0016
USPC .................................................. 156/132, 136
See application file for complete search history.

(56) References Cited

U.S. PATENT DOCUMENTS

| | | | |
|---|---|---|---|
| 3,547,733 A | 12/1970 | Leblond et al. | |
| 4,196,036 A | 4/1980 | Allen et al. | |
| 5,651,849 A * | 7/1997 | Pizzorno | B29D 30/50 156/132 |
| 2012/0024464 A1 | 2/2012 | Marchini et al. | |

FOREIGN PATENT DOCUMENTS

| | | | |
|---|---|---|---|
| DE | 102011050142 | * 11/2012 | ............ B29D 30/32 |
| EP | 0 192 112 | 8/1986 | |
| EP | 0 647 522 | 4/1995 | |
| EP | 0 976 535 | 2/2000 | |
| RU | 2 230 665 | 5/2001 | |
| WO | WO 2010/116253 | 10/2010 | |

OTHER PUBLICATIONS

Werner, DE 2645178, machine translation. (Year: 1978).*
Schulze, DE 102008032382, machine translation. (Year: 2009).*
Official Action in Russian counterpart application No. 2016141346/02, dated Nov. 1, 2018 (9 pages including translation).
Search Report in Russian counterpart application No. 2016141346/02, dated Nov. 1, 2018 (4 pages including translation).
International Search Report from the European Patent Office for International Application No. PCT/IB2015/052105, dated Jun. 22, 2015.
Written Opinion of the International Searching Authority from the European Patent Office for International Application No. PCT/IB2015/052105, dated Jun. 22, 2015.

* cited by examiner

PROCESS AND DRUM FOR LOOPING ANNULAR ANCHORING STRUCTURES IN A PROCESS FOR BUILDING TYRES FOR VEHICLE WHEELS

CROSS REFERENCE TO RELATED APPLICATIONS

This application is a national phase application based on PCT/IB2015/052105, filed Mar. 23, 2015, and claims the priority of Italian Patent Application No. MI2014A000489, filed Mar. 24, 2014, the content of each application being incorporated herein by reference.

BACKGROUND of THE INVENTION

Field of the Invention

The present invention relates to a process for looping annular anchoring structures in a process for building tyres for vehicle wheels.

The invention also relates to a drum which can be used to carry out the aforementioned process.

Description of the Related Art

The process and the drum of the invention are preferably used in building tyres for automobiles, more specifically in building the carcass structures of such tyres.

Hereafter, the term "loop" is used to indicate an annular element comprising one or more thread-like reinforcing elements that are substantially parallel to each other, such as textile or metallic cords, possibly incorporated in, or coated with, a layer of elastomeric material, such an annular element being obtained by cutting to size a band-like element and joining together a head portion and a tail portion of such a band-like element.

The term "elastomeric material" is used to indicate a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross linked through heating, so as to form the end product.

The terms "radial" and "axial" and the expressions "radially inner/outer" and "axially inner/outer" are used with reference to the radial direction and to the axial (or longitudinal) direction of a tyre or of a drum used for looping the annular anchoring structures of tyres. The terms "circumferential" and "circumferentially", on the other hand, are used with reference to the annular extension of the aforementioned tyre/drum.

A tyre for vehicle wheels generally comprises a carcass structure comprising at least one carcass ply formed of reinforcing cords embedded in a matrix of elastomeric material. The carcass ply has end edges respectively engaged with annular anchoring structures. The latter are arranged in the areas of the tyre usually identified by the name "beads" and each of them is normally formed by a substantially circumferential annular insert on which at least one filling insert is applied, in a radially outer position. The annular inserts are usually identified as "bead cores" and have the task of keeping the tyre firmly fixed to the anchoring seat specifically provided in the rim of the wheel, thus preventing, in operation, the radially inner end edge of the tyre coming out from such a seat.

Specific reinforcing structures (such reinforcing structures being known in the field of tyres by the term "loops") having the function of improving the torque transmission to the tyre may be provided at the beads. The region of the beads is, indeed, particularly active in the transmission of torque from the rim to the tyre during acceleration and braking and, therefore, the provision of suitable reinforcing structures in such an area ensures that the transmission of torque takes place with the maximum possible reactivity.

A crown structure is associated in a radially outer position with respect to the carcass ply. The crown structure comprises a belt structure and, in a radially outer position with respect to the belt structure, a tread band made from elastomeric material.

The belt structure comprises one or more belt layers arranged radially one on top of the other and having reinforcing textile or metallic cords with a crossed orientation and/or an orientation substantially parallel to the direction of circumferential extension of the tyre.

On the side surface of the carcass structure, each extending from one of the side edges of the tread band up to the respective annular anchoring structure to the beads, respective sidewalls made of elastomeric material are applied.

EP 0 647 522 describes a looping process comprising at first the deposition of a loop on the outer annular surface of a plurality of central sectors of a service drum, said central sectors being distributed circumferentially one after the other. The annular anchoring structure is then positioned on the loop. The central sectors are then moved radially until the loop is made to adhere to the radially inner surface of the annular anchoring structure. The loop is then turned up around the annular anchoring structure as a result of the thrusting action exerted on the loop portions that extend axially from opposite sides with respect to the annular anchoring structure from the lobes of an air chamber, such lobes being obtained, upon inflating said air chamber, by squashing said air chamber with a pair of auxiliary support elements arranged in a radially outer position with respect to the air chamber.

WO 2010/116253, in the name of the Applicant, describes a looping process comprising at first setting a service drum to a predetermined radial dimension as a function of the fitting diameter of the tyre to be manufactured. The loop is then deposited on the drum and the annular anchoring structure is positioned on the drum in a radially outer position with respect to the loop. Then the drum is radially expanded until the annular anchoring structure is locked in position. The drum is then set in rotation about its rotation axis and, during such rotation, the looping of the annular anchoring structure is carried out through a pair of turning rollers able to be moved with respect to the drum both along a direction parallel to the rotation axis of the drum and along a direction perpendicular to the aforementioned axis.

The Applicant has observed that the provision of a service drum that is at least partially radially expandable/contractible, as described in EP 0 647 522 and WO 2010/116253, makes it possible to loop in sequence annular anchoring structures of different size configured for tyres having different fitting diameters, consequently increasing the flexibility of production without reducing the productivity of the plant.

SUMMARY OF THE INVENTION

The Applicant has, however, observed that carrying out a process of the type described in EP 0 647 522 is problematic in those cases in which the loop comprises metallic cords.

Indeed, in these cases an early deterioration of the air chamber occurs as a result of the sliding of the air chamber on the metallic cords of the loop. It is thus necessary to replace the air chamber quite frequently, with consequent problems of cost and time.

The Applicant has also observed that the looping process described in WO 2010/116253 necessarily requires the rotation of the drum (and therefore of the annular anchoring structure) during the turning up of the opposite end edges of the loop on the annular anchoring structure. This can lead to an undesired deformation of the annular anchoring structure, at the expense of the quality of the looping.

The Applicant has also observed that the looping processes of the type described in EP 0 647 522 and WO 2010/116253 both require the use of members which are external with respect to the drum (reference is made in particular to the two auxiliary support elements of EP 0 647 522 and the two turning rollers of WO 2010/116253). The presence of such external members with respect to the drum can constitute a problem when there are constraints in terms of bulk and/or layout.

The Applicant has perceived the need to provide a looping process in which members incorporated in the drum are used, so as not to worry about possible constraints in terms of bulk and/or layout, and which does not require the rotation of the annular anchoring structures during the turning of the loop, so as not to deform the annular anchoring structures.

In this respect, the Applicant has realised that it may be advantageous to use a radially expandable/contractible drum (thus suitable for looping in sequence annular anchoring structures of different size) provided with turning members other than air chambers (so as to be able to work even with loops comprising metallic cords).

The Applicant has found that by providing a drum comprising a radially expandable/contractible intermediate annular portion and a pair of radially expandable/contractible lateral annular portions arranged on opposite sides with respect to the intermediate annular portion and each comprising a plurality of circumferentially adjacent angular sectors which can be moved in a synchronous manner both radially and axially, it is possible to achieve both the desired radial expansion/contraction of the drum, to allow the looping of annular anchoring structures of different diameter, and the desired turning up of the loop through turning members incorporated in the drum.

The present invention therefore relates, in a first aspect thereof, to a process for looping annular anchoring structures in a process for building tyres for vehicle wheels.

Preferably, it is foreseen to deposit a loop on a drum comprising a radially expandable/contractible intermediate annular portion and, in a position axially adjacent to the opposite axial ends of said intermediate annular portion, a pair of radially expandable/contractible lateral annular portions.

Preferably, it is foreseen to associate an annular anchoring structure with a radially outer annular surface portion of said loop defined at said intermediate annular portion.

Preferably, it is foreseen to turn up each of opposite end edges of said loop on said annular anchoring structure through said lateral annular portions.

Preferably, each of said end edges is turned up as a result of a thrusting stress imparted by a respective lateral annular portion of said pair of lateral annular portions because of a synchronous radial movement and a synchronous axial displacement of a respective plurality of circumferentially adjacent first angular sectors.

The Applicant believes that the process described above, making use of a drum having a radially expandable/contractible intermediate annular structure, allows to loop in sequence annular anchoring structures of different size. Moreover, thanks to the fact that the turning up of the end edges of the loop on the annular anchoring structure is achieved as a result of the synchronous radial and axial movement of a plurality of angular sectors of the drum arranged at opposite lateral annular portions of the drum, it is possible to carry out the looping of the annular anchoring structures, even in the presence of constraints in terms of bulk and layout, with loops of any type (thus also with loops comprising metallic cords) and without any risk of deforming the annular anchoring structure.

In a second aspect thereof, the present invention relates to a drum for looping annular anchoring structures in a process for building tyres for vehicle wheels.

Preferably, a radially expandable/contractible intermediate annular portion is provided.

Preferably, a pair of radially expandable/contractible lateral annular portions is provided in a position axially adjacent to the opposite axial ends of said intermediate annular portion.

Preferably, each lateral annular portion of said pair of lateral annular portions comprises a plurality of circumferentially adjacent first angular sectors capable of being moved radially and axially synchronously with each other.

According to the Applicant, such a drum makes it possible to carry out the looping process described above, thus allowing all of the advantages discussed above to be achieved.

The present invention, in at least one of the aforementioned aspects, can have at least one of the following preferred characteristics, taken individually or in combination with each other.

Preferably, the synchronous axial displacement of said first angular sectors is carried out simultaneously with said radial movement. In this way it is possible to obtain a progressive and gradual deposition of the end edges of the loop on the side surfaces of the annular anchoring structure, with consequent advantages in terms of deposition quality, speed of execution and quick set-up.

Preferably, said axial displacement is achieved as a result of an axial elastic thrust exerted on each of said first angular sectors. Advantageously, the first angular sectors thus tend to thrust the end edges of the loop against the side surface of the annular anchoring structure, in this way contributing to obtain the desired deposition quality and speed of execution. Moreover, since it is an elastic thrust, and therefore reversible, it is extremely easy to provide for axially moving the first angular sectors away from the annular anchoring structure at the end of the turning up of the end edges of the loop to allow the annular anchoring structure just looped to be picked up and taken away.

In preferred embodiments of the invention, before depositing said loop, at least said intermediate annular portion is radially expanded up to reach an operating diameter that is selected depending on a fitting diameter of a tyre to be built. There is therefore the possibility of looping annular anchoring structures intended for tyres having different fitting diameters, in this way achieving advantageous process economy.

Preferably, associating said annular anchoring structure comprises positioning said annular anchoring structure in a radially outer position with respect to said loop at said intermediate annular portion. This is made irrespective of the diameter of the annular anchoring structure.

Advantageously, the aforementioned positioning of the annular anchoring structure is achieved using a transfer member configured to keep the annular anchoring structure centred with respect to the middle of the drum and to leave the radially inner surface of the annular anchoring structure completely free.

More preferably, associating said annular anchoring structure comprises radially expanding at least said intermediate annular portion until a radial thrust is exerted on a radially inner surface of said annular anchoring structure. In this way an operative configuration is achieved in which the annular anchoring structure is held in position on the drum without the need to foresee specific holding members outside the drum. In this operative configuration the aforementioned transfer member can leave the annular anchoring structure to allow the deposition of the end edges of the loop on the opposite side surfaces of the annular anchoring structure.

In preferred embodiments of the invention, said radial thrust is an elastic thrust. Such a provision makes it possible to obtain the desired holding of the annular anchoring structure on the drum in an extremely simple and effective manner irrespective of the diameter of the annular anchoring structure. Moreover, since it is an elastic thrust, and therefore reversible, it is extremely easy to also detach the annular anchoring structure from the drum at the end of the looping process.

Preferably, the radial expansion of at least said intermediate annular portion is carried out simultaneously with at least part of the radial movement of said first angular sectors. This contributes to achieve the desired process economy and speed of execution.

Preferably, the radial expansion of at least said intermediate annular portion is achieved as a result of the synchronous radial movement of a plurality of circumferentially adjacent second angular sectors.

Preferably, the radial movement of each of said second angular sectors is obtained as a result of an elastic thrust exerted on each of said second angular sectors.

In preferred embodiments of the invention, at the end of the turning up of said opposite end edges of said loop, said first angular sectors are axially moved away from said annular anchoring structure. This is made in order to allow the subsequent removal of the looped annular anchoring structure.

Preferably, said first angular sectors are locked in a distal axial position with respect to said annular anchoring structure. Such a provision facilitates the aforementioned removal.

Even more preferably, said first angular sectors are radially contracted after said first angular sectors are locked at said distal axial position. Advantageously, following such radial contraction the annular anchoring structure just looped can be picked up by a suitable removal device, which then takes care of removing the looped annular anchoring structure. Advantageously, the actuation of the aforementioned radial contraction only after the axial locking of the first angular sectors makes it possible to eliminate any possible contact between the first angular sectors and the loop just deposited on the side surfaces of the annular anchoring structure. Such contact could indeed cause an undesired detachment of the end edges of the loop from the side surfaces of the annular anchoring structure.

Preferably, at the end of the radial contraction of said first angular sectors, said first angular sectors are unlocked from said distal axial position. In this way, the drum goes back to the initial configuration, ready to proceed with the looping of another annular anchoring structure.

In preferred embodiments thereof, said intermediate annular portion comprises a plurality of circumferentially adjacent second angular sectors radially movable synchronously with each other.

Preferably, said intermediate annular portion comprises, in a radially inner position with respect to each of said second angular sectors, a first elastic element acting to radially thrust a respective second angular sector.

Preferably, each of said first angular sectors is slidably associated with a radially outer surface of a radially movable support body.

Preferably, each of said second angular sectors is kept in a radial contracted position against said radial thrust by a pair of axially opposite first angular sectors.

In preferred embodiments of the invention, each of said first angular sectors comprises a second elastic element acting to axially thrust an axially outer end thereof.

Preferably, each of said first angular sectors comprises a contact element associated with an axially inner end thereof. Preferably, said contact element is made from deformable or elastic material. In a specific embodiment thereof, said contact element is a roller.

Preferably, the drum comprises a locking assembly for stopping the axial movement of said first angular sectors.

In preferred embodiments thereof, said locking assembly comprises a pair of holes formed on said radially outer surface of said support body.

Preferably, said locking assembly also comprises a pin associated with a respective first angular sector.

More preferably, said locking assembly comprises a third elastic element acting between said pin and the respective first angular sector so that, in an axial locking condition of said first angular sector, a free end portion of said pin is housed inside one of said holes and, in an axial unlocking condition of said first angular sector, said free end portion of said pin is outside of said hole.

In preferred embodiments thereof, said locking assembly comprises, at an axially outer end of said first angular sectors, a contrast ring.

Preferably, said locking assembly further comprises a plurality of balancing levers, each of which having a first end pivoted at an axially outer end of a respective first angular sector and a second end configured to cooperate with said contrast ring when said first angular sector is in a condition of maximum expansion.

Preferably, when said second end of said balancing lever is not in contact with said contrast ring said first angular sector is in said axial unlocking condition and when said second end of said balancing lever is in contact with said contrast ring said first angular sector reaches said axial locking condition.

Preferably, the drum comprises an unlocking assembly for unlocking the axial movement of said first angular sectors.

More preferably, said unlocking assembly comprises a spigot configured to expel said free end portion of said pin from said hole when said first angular sector is radially contracted until a condition of maximum contraction is reached.

Even more preferably, said spigot is arranged in a radially outer position with respect to a guide bar provided for guiding the radial movement of said first angular sector.

Preferably, a screw-lead nut coupling is provided at each of said opposite axial ends of said intermediate annular portion.

More preferably, a plurality of levers are used, each of which having a first end pivoted at a respective lead nut and a second end pivoted at a respective first angular sector.

Preferably, said screw comprises a first axial portion with a right-handed thread and a second axial portion with a left-handed thread, or vice-versa.

BRIEF DESCRIPTION OF THE DRAWINGS

Further characteristics and advantages of the present invention will become clearer from the following detailed description of preferred embodiments thereof, made with reference to the attached drawings. In such drawings.

DETAILED DESCRIPTION OF THE INVENTION

Figure 1:
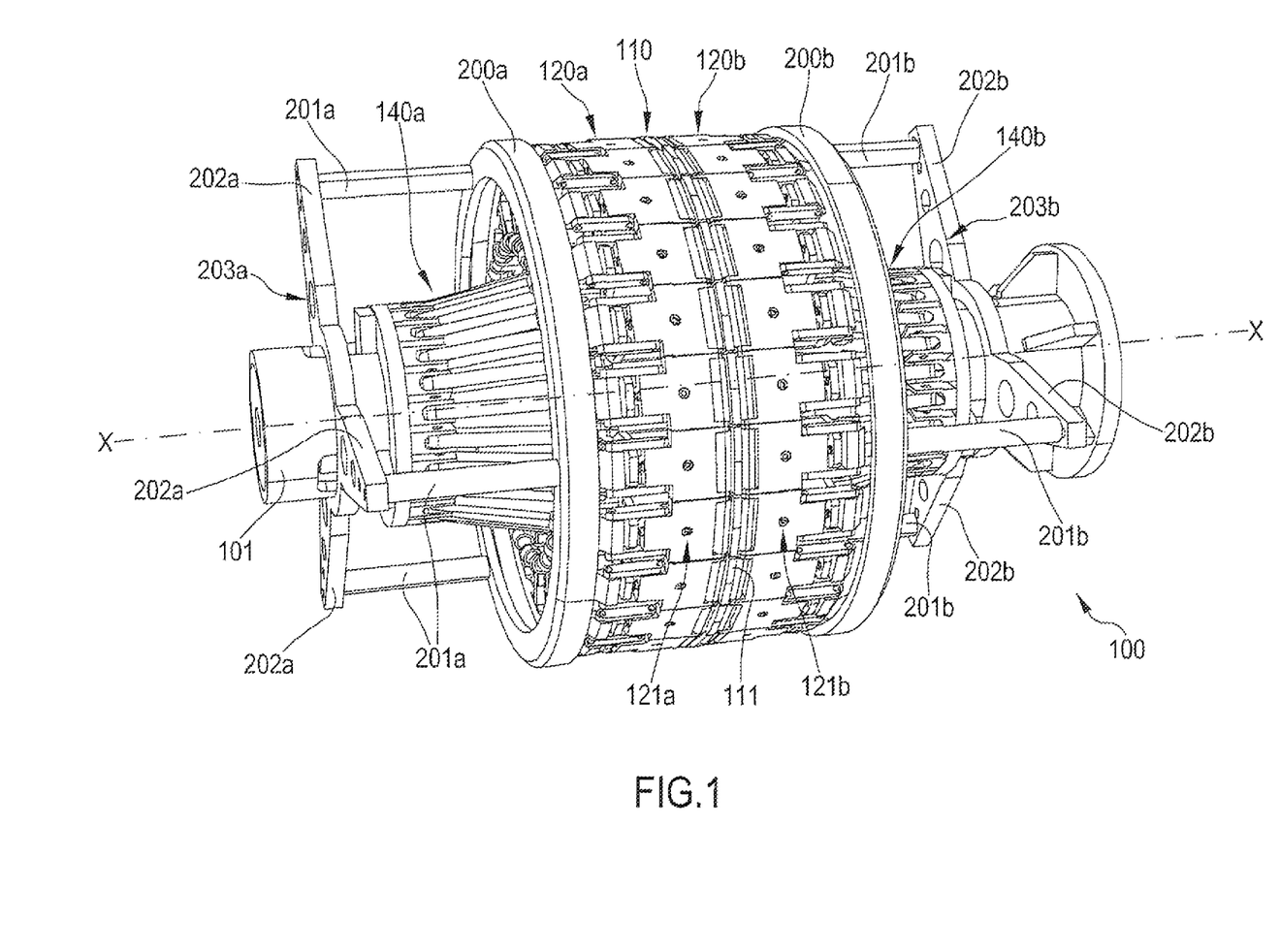
FIG. 1 is a schematic perspective view of a drum in accordance with the present invention.

In FIG. 1, reference numeral 100 wholly indicates an exemplifying embodiment of a drum for looping annular anchoring structures in accordance with the present invention. Such looping is carried out in a process for building tyres for vehicle wheels, preferably for automobile wheels.

Preferably, the annular anchoring structures, once looped, are used in building the carcass structures of the aforementioned tyres. In particular, they are positioned in the beads of the tyre and are intended to keep the tyre firmly fixed to the anchoring seat specifically provided in the rim of the vehicle wheel.

Figure 3:
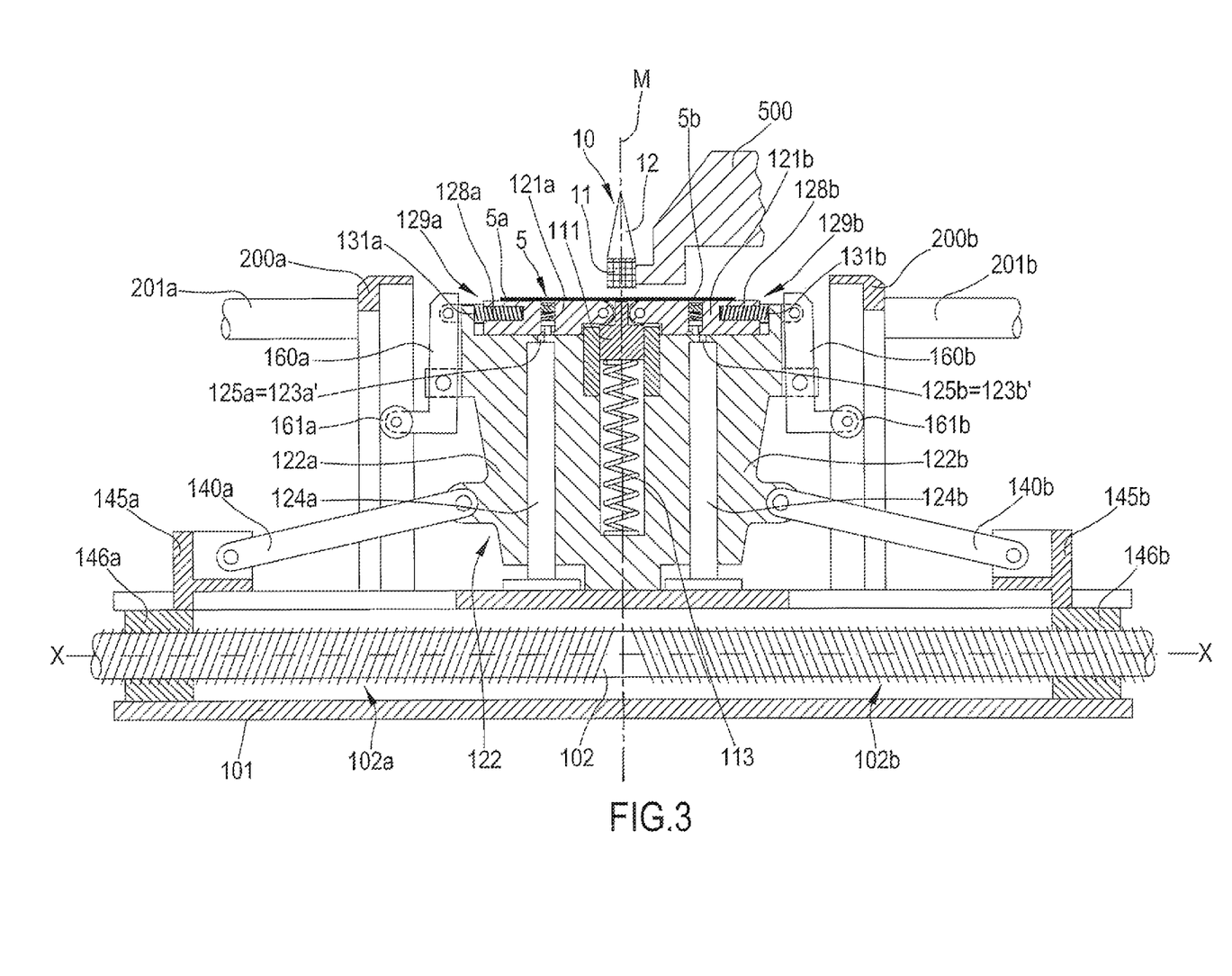
FIG. 3 is a schematic partial section view of the portion of drum of FIG. 1 in a subsequent operative configuration thereof.

An example of an annular anchoring structure intended to be looped on the drum 100 is shown in FIG. 3 and is indicated with reference numeral 10.

The annular anchoring structure 10 comprises a substantially circumferential annular insert 11, also called bead core, and a filling insert 12. The latter is associated with the substantially circumferential annular insert 11 in a radially outer position with respect to the latter.

Figure 5:
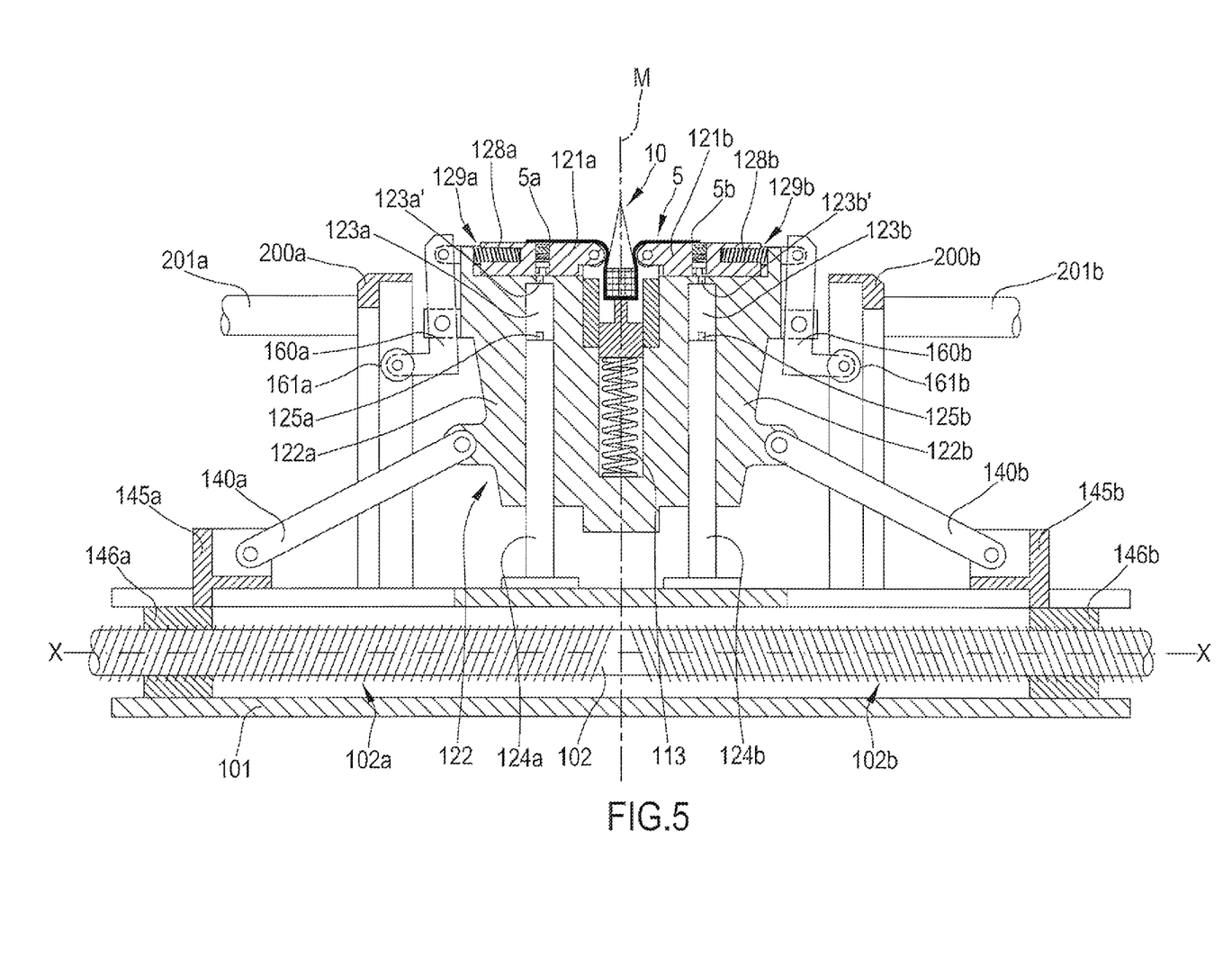
FIG. 5 is a schematic partial section view of the portion of drum of FIG. 1 in an operative configuration subsequent to that of FIG. 4.
Figure 6:
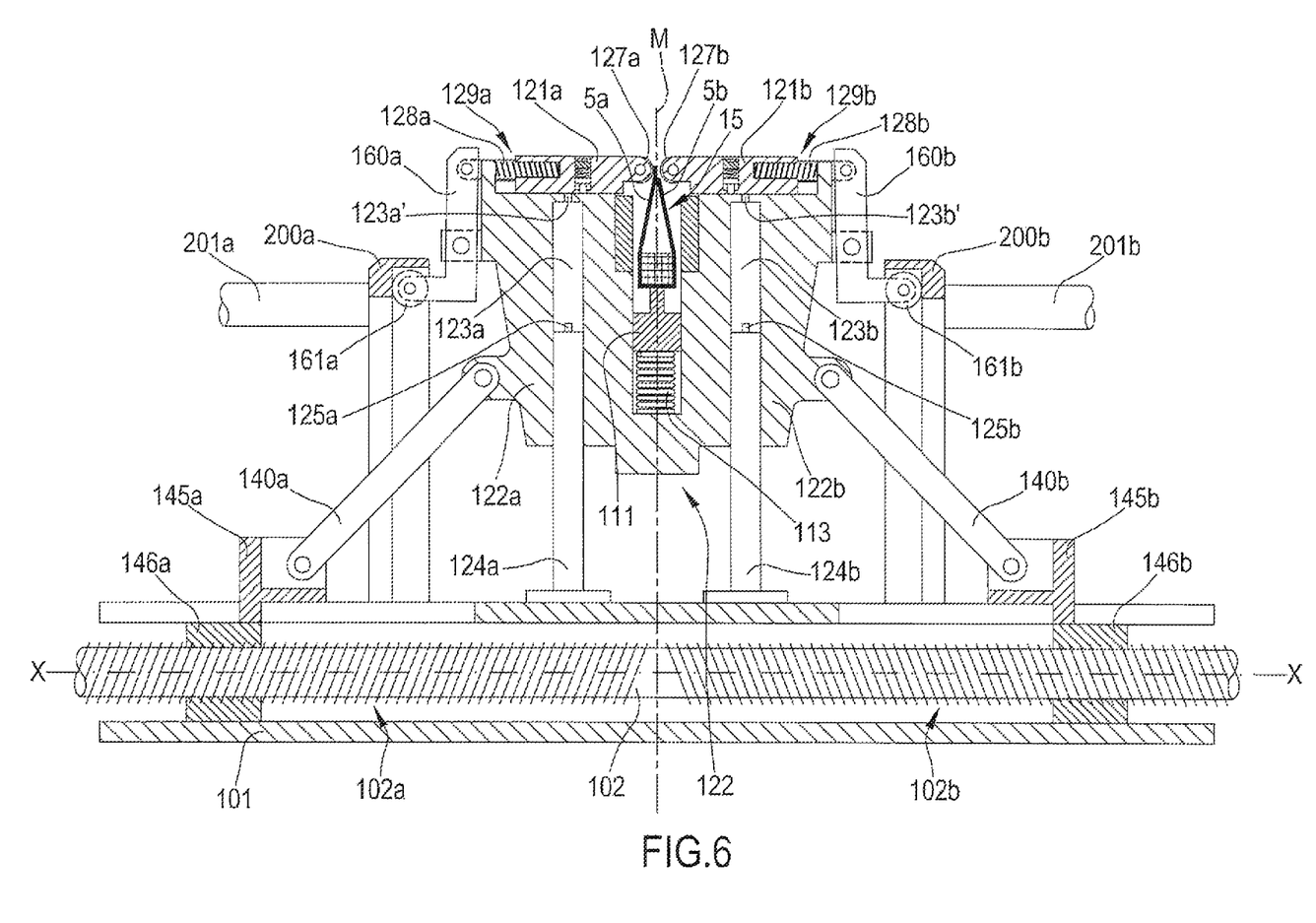
FIG. 6 is a schematic partial section view of the portion of drum of FIG. 1 in an operative configuration subsequent to that of FIG. 5.
Figure 7:
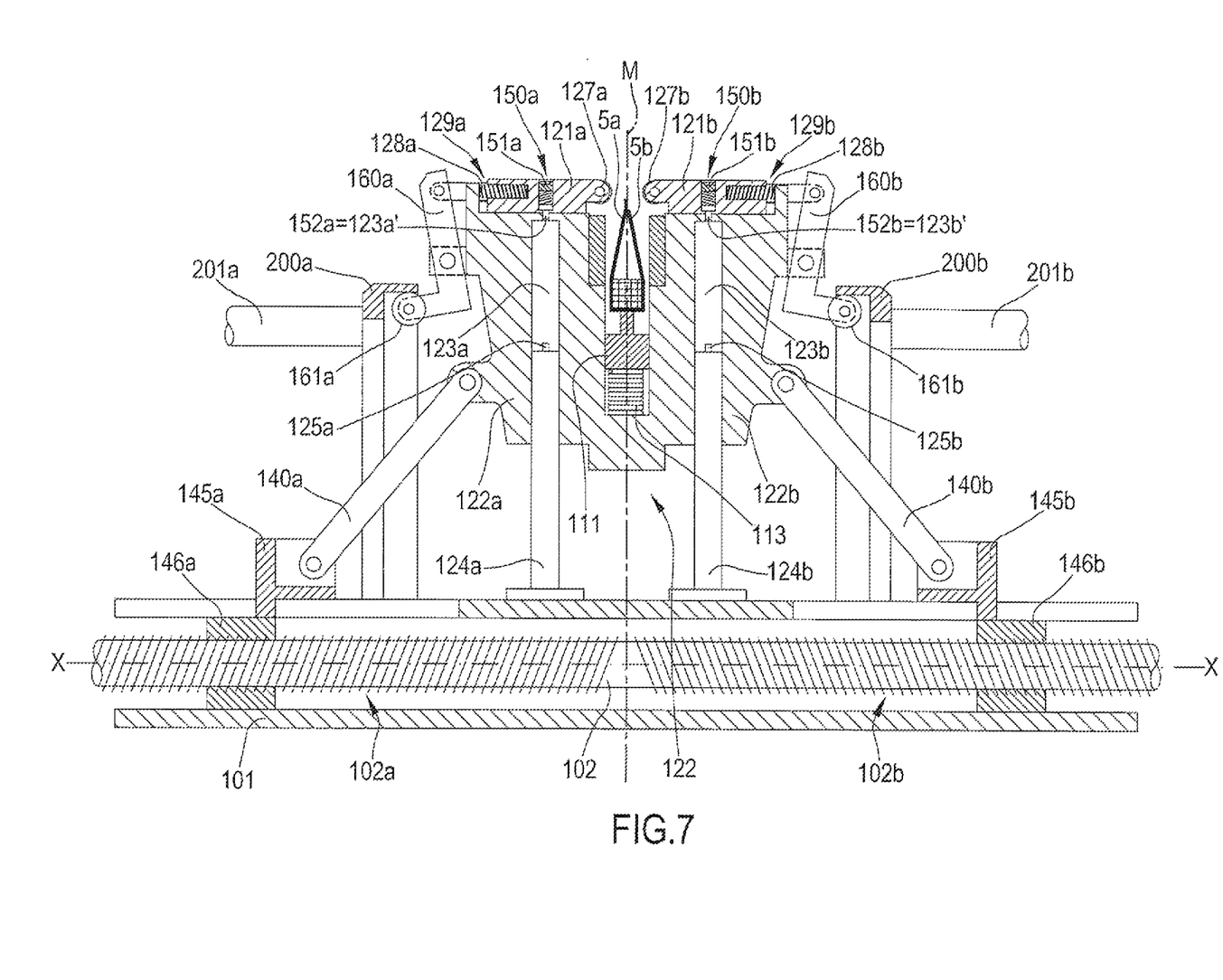
FIG. 7 is a schematic partial section view of the portion of drum of FIG. 1 in an operative configuration subsequent to that of FIG. 6.
Figure 8:
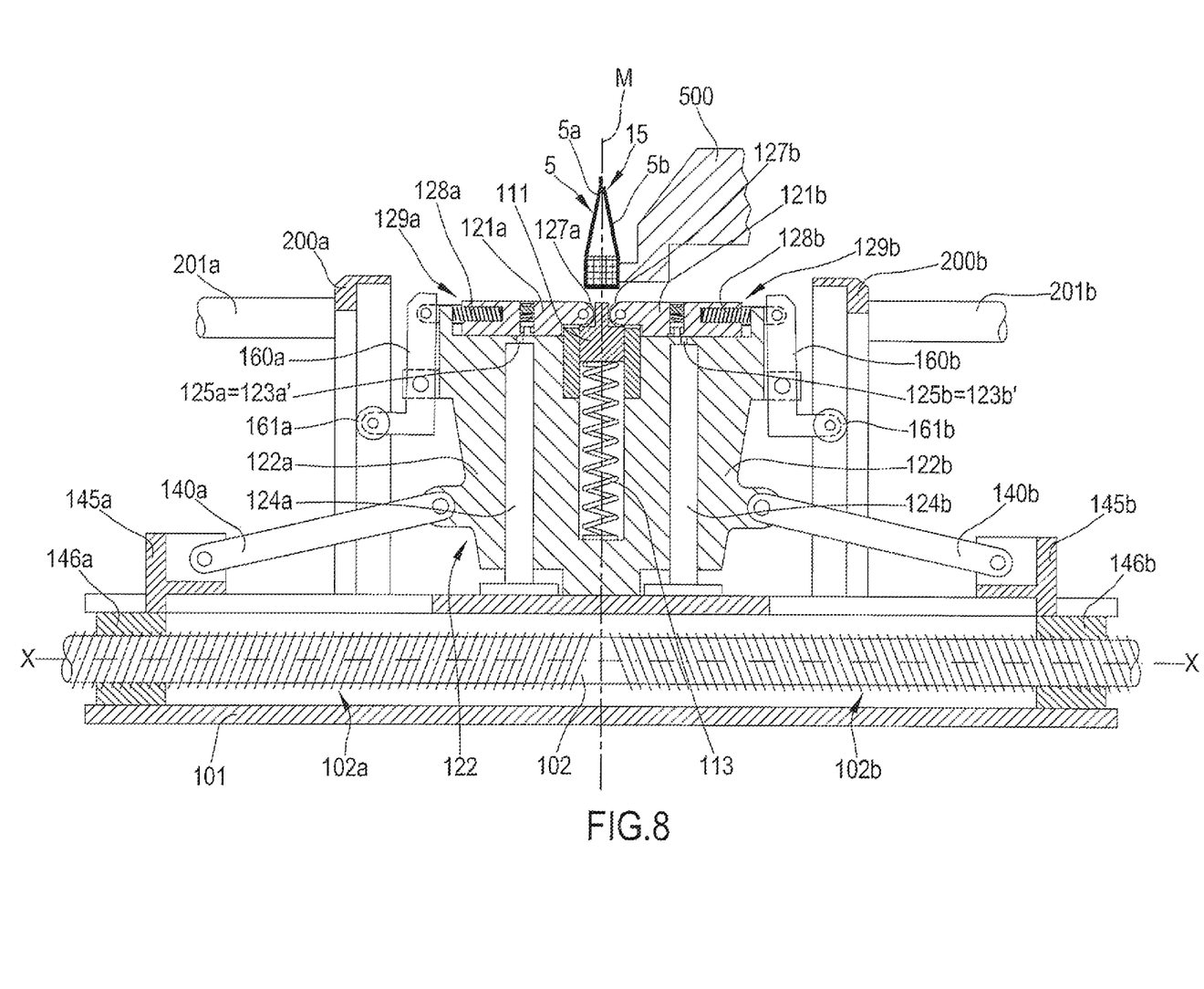
FIG. 8 is a schematic partial section view of the portion of drum of FIG. 1 in an operative configuration subsequent to that of FIG. 7.

The looping of the annular anchoring structure 10 comprises the deposition of a loop 5 on the radially outer surface of the drum 100 (FIG. 2), the positioning of the annular anchoring structure 10 in a radially outer position with respect to the drum 100 through a transfer member 500 (FIG. 3), the coupling of the loop 5 with the radially inner surface of the annular anchoring structure 10 (FIG. 4) and the turning up of the opposite edges 5a, 5b of such a loop 5 around the annular anchoring structure 10 so as to completely surround the latter (FIGS. 5-7), thus forming a reinforced annular anchoring structure 15 (FIGS. 6-8). Subsequently, the reinforced annular anchoring structure 15 is picked up by a transfer member, which can for example be the same transfer member 500 used to position the annular anchoring structure 10 on the drum 100.

Preferably, at the end of the looping process the end portions of the end edges 5a, 5b of the loop 5 are offset in the radial direction, for example by at least a few millimetres (preferably by about 5 mm).

The drum 100 can be part of a work station in which there are at least one first storage member for storing annular anchoring structures 10 to be looped and at least one second storage member for storing reinforced annular anchoring structures 15. The aforementioned storage members can be part of a handling line arranged close to the drum 100.

With reference to FIG. 1, the drum 100 extends concentrically to a longitudinal axis X-X.

The drum 100 comprises an intermediate annular portion 110 and, in a position axially adjacent to the opposite axial ends of said intermediate annular portion 110, a pair of lateral annular portions 120a, 120b.

Both the intermediate annular portion 110 and the lateral annular portions 120a, 120b are radially expandable/contractible.

In particular, the intermediate annular portion 110 comprises a plurality of identical angular sectors 111, which are circumferentially adjacent and radially movable synchronously with each other.

Hereinafter, the angular sectors 111 will be identified as "intermediate angular sectors". For the sake of simplicity of illustration, in FIG. 1 the reference numeral 111 is associated with only one of the intermediate angular sectors.

Each of the lateral annular portions 120a, 120b comprises a plurality of identical angular sectors 121a, 121b, which are circumferentially adjacent and radially movable synchronously with each other.

Hereinafter, the angular sectors 121a, 121b will be identified as "lateral angular sectors". For the sake of simplicity of illustration, in FIG. 1 the reference numerals 121a and 121b are associated with only one of the angular sectors of the lateral annular portion 120a and with only one of the angular sectors of the lateral annular portion 120b, respectively.

The synchronous radial movement of the lateral angular sectors 121a is synchronous with the synchronous radial movement of the lateral angular sectors 121b, as described more clearly hereinafter.

The drum 100 also comprises, in a radially inner position with respect to the intermediate angular sectors 111 and to the lateral angular sectors 121a, 121b, a sleeve 101 extending coaxially to the longitudinal axis X-X.

The sleeve 101 is preferably fixed canti-levered on a bearing structure that is not illustrated, so as to allow the annular anchoring structure 100 to be placed in a radially outer position with respect to the drum 100.

Figure 2:
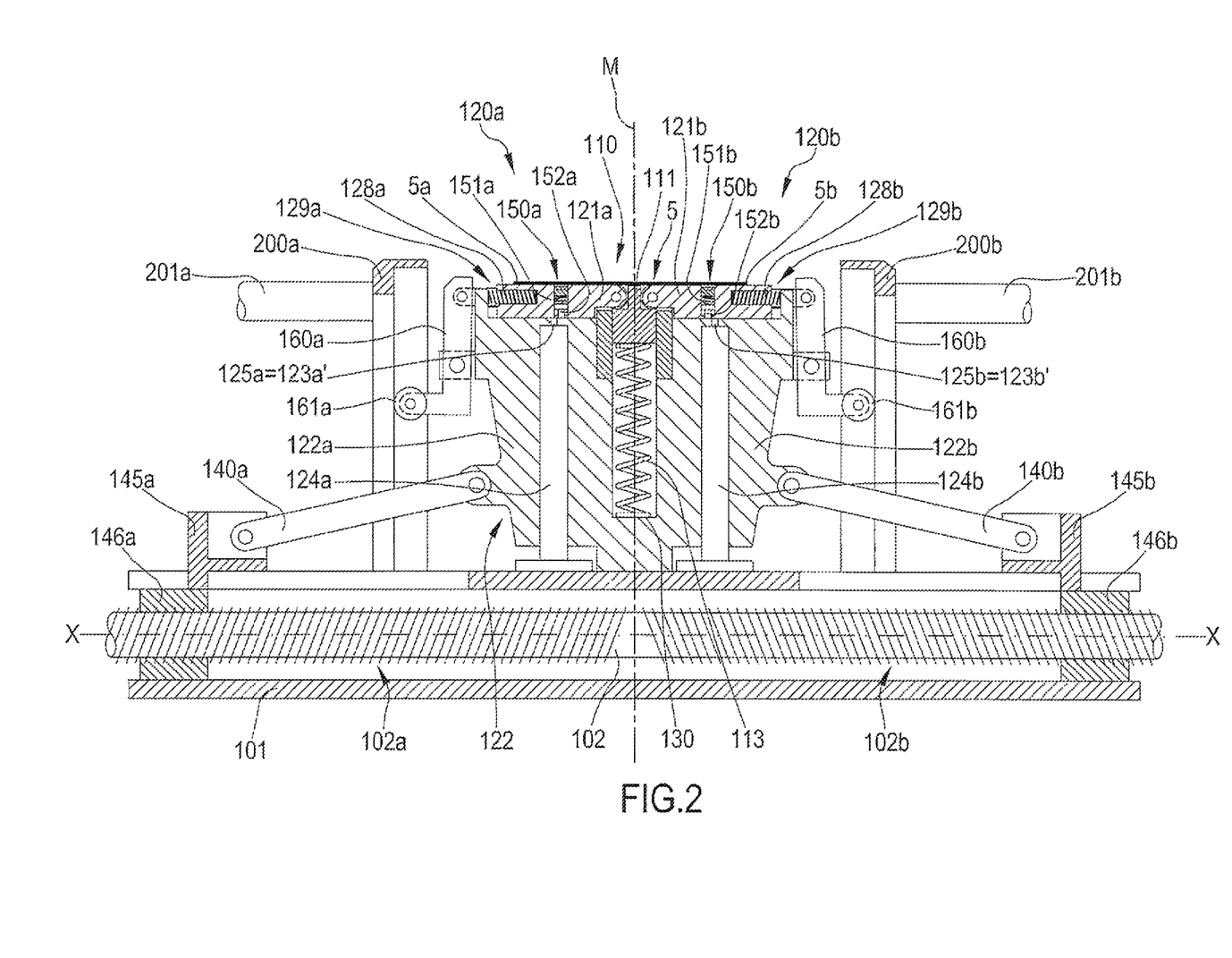
FIG. 2 is a schematic radial section view of a portion of the drum of FIG. 1 in a first operative configuration thereof.

As shown in FIG. 2, inside the sleeve 101, and coaxially to the longitudinal axis X-X, a worm screw 102 is provided. The worm screw 102 has a first right-handed axial portion 102a and, on the opposite side with respect to a middle plane M of the drum 100, a second left-handed axial portion 102b.

The screw 102 is supported inside the sleeve 101 by a pair of rolling bearings, not shown. Such a screw 102 can be set in rotation by a suitable motor group, also not shown.

The right-handed axial portion 102a (or the left-handed one 102b) is defined in a radially inner position with respect to the lateral angular sectors 121a, whereas the left-handed axial portion 102b (or the right-handed one 102a) is defined in a radially inner position with respect to the lateral angular sectors 121b.

With reference to FIG. 1, the drum 100 also comprises, in an axially outer position with respect to the lateral annular portions 120a, 120b, respective contrast rings 200a, 200b.

Each contrast ring 200a, 200b is fixedly associated with the sleeve 101 through a plurality of axial brackets 201a, 201b and a plurality of radial brackets 202a, 202b. Preferably, the axial brackets 201a, 201b and the radial brackets 202a, 202b are arranged in an axially outer position with respect to the respective contrast ring 200a, 200b.

Each axial bracket 201a, 201b has an axial end associated with the contrast ring 200a, 200b and an opposite axial end associated with a respective radial bracket 202a, 202b, in turn fixedly associated with the sleeve 101.

The axial brackets 201a, 201b can be fixedly associated with the respective contrast ring 200a, 200b or can be removably associated with the contrast ring 200a, 200b.

In the exemplifying embodiment of the drum 100 shown in FIG. 1, at each contrast ring 200a, 200b there are three axial brackets 201a, 201b and three radial brackets 202a, 202b, all circumferentially spaced apart by 120°.

Again with reference to the exemplifying embodiment of FIG. 1, each radial bracket 202a, 202b comprises a plurality of weight reduction holes 203a, 203b (four in the illustrated embodiment) aligned in the radial direction.

For the sake of simplicity of illustration, reference numeral 203a, 203b is associated with only one hole of only one radial bracket 202a, 202b.

Preferably, the radial brackets 202a, 202b are tapered progressively moving in the radially outward direction.

FIGS. 2-8 show the mutual arrangement of an intermediate angular sector 111 and of the two lateral angular sectors 121a, 121b arranged on axially opposite sides with respect to the intermediate angular sector 111 in different operative configurations of the drum 100. The same mutual arrangement can be found, in each of the aforementioned operative configurations, at each of the other circumferentially adjacent angular sectors 111, 121a and 121b of the drum 100.

The lateral angular sectors 121a and 121b are arranged in a mirror-like fashion with respect to the middle plane M of the drum 100.

With reference to FIGS. 2-8, each intermediate angular sector 111 preferably comprises an inverted T-shaped body; it thus preferably comprises a radially outer portion having a predetermined axial length and a radially inner portion having a greater axial length than that of the radially outer portion.

A respective elastic element 113, acting in radial thrust on the intermediate angular sector 111, is arranged in a radially inner position with respect to the intermediate angular sector 111.

Preferably, the elastic element 113 is a compression spring.

In the specific exemplifying embodiment illustrated in FIGS. 2-8, a support body 122 is provided in a radially inner position with respect to each pair of axially adjacent lateral angular sectors 121a, 121b. Such a support body 122 comprises two support body portions 122a, 122b arranged symmetrically on axially opposite sides with respect to the middle plane M of the drum 100. The support body portion 122a is arranged in a radially inner position with respect to the lateral angular sector 121a and the support body portion 122b is arranged in a radially inner position with respect to the lateral angular sector 121b.

Each support body portion 122a, 122b is provided with a hole 123a, 123b extending in the radial direction (FIGS. 5-7). The hole 123a, 123b houses, through a sliding coupling, a respective guide bar 124a, 124b fixedly associated with the sleeve 101 and extending in the radial direction. As a result of the aforementioned sliding coupling the support body 122 can move radially with respect to the sleeve 101.

The hole 123a, 123b has a radially outer portion with reduced diameter, which hereafter is called hole 123a', 123b'.

The guide bar 124a, 124b has a spigot 125a, 125b on a radially outer surface thereof (FIGS. 5-7).

In the operative configurations of the drum 100 in which the lateral angular sectors 121a, 121b are radially contracted (FIGS. 2, 3 and 8), the spigot 125a, 125b is housed in the hole 123a', 123b'. In the aforementioned figures, such a specific configuration is indicated with the following string of reference numerals: 125a=123a', 125b=123b'.

An end portion of a respective lever 140a, 140b is pivoted on each support body portion 122a, 122b. The opposite end portion of the lever 140a, 140b is pivoted at a flange 145a, 145b fixedly associated with a lead nut 146a, 146b coupled with a respective axial portion 102a, 102b of the screw 102.

As a result of the screw-lead nut coupling and of the sliding coupling between support body 122 and guide bar 124a, 124b described above, a rotation of the screw (for example in the clockwise direction, if starting from the operative configuration of FIG. 2 and in the anti-clockwise direction if starting from the operative configuration of FIG. 7) produces a synchronous axial displacement of the flanges 145a, 145b in opposite directions (in particular the flanges 145a, 145b moves one towards the other if starting from the operative configuration of FIG. 2, and the flanges 145a, 145b move away from one other if starting from the operative configuration of FIG. 7) and consequently a synchronous radial displacement of the support body 122 (in particular a radial expansion of the lateral annular portions 120a, 120b if starting from the operative configuration of FIG. 2, and a radial contraction of the lateral annular portions 120a, 120b if starting from the operative configuration of FIG. 7).

As shown in FIG. 2, the support body 122, comprises, in a radially inner position, a shoulder 130 on which a radially inner end of the elastic element 113 is arranged in abutment. Such an elastic element 113 is thus held in compression between the shoulder 130 and the radially inner surface of the intermediate angular sector 111.

Each lateral angular sector 121a, 121b comprises, at an axially inner end thereof, a contact element 127a, 127b preferably made from deformable or elastic material. For the sake of simplicity of illustration the reference numerals 127a and 127b are reproduced only in FIGS. 4 and 6-8.

The contact elements 121a, 121b ensure the continuity of surface contact between loop 5 and annular anchoring structure 10 during the looping of the latter.

A respective elastic element 128a, 128b acts on an axially outer end of each lateral angular sector 121a, 121b. Such an elastic element 128a, 128b axially thrusts the respective lateral angular sector 121a, 121b towards the middle plane M of the drum 100.

Preferably, the elastic element 128a, 128b is a compression spring housed in an axial seat 129a, 129b formed on an axially outer end portion of the lateral angular sector 121a, 121b.

As shown in FIG. 3, the support body 122 comprises, in a radially outer position, a pair of shoulders 131a, 131b. An axially outer end of a respective elastic element 128a, 128b goes into abutment on each shoulder 131a, 131b. Each elastic element 128a, 128b is thus held in compression between the shoulder 131a, 131b and the axially outer end portion of the lateral angular sector 121a, 121b.

In the operative configuration of the drum 100 shown in FIGS. 2, 3 and 8, as a result of the axial thrust exerted by the elastic element 128*a*, 128*b* on the lateral angular sector 121*a*, 121*b*, the axially inner end portion of each of the two opposite lateral angular sectors 121*a*, 121*b* is in axial abutment against the radially outer portion of the intermediate angular sector 111, thus counteracting the elastic thrust exerted on the lateral angular sectors 121*a*, 121*b* by the respective elastic elements 128*a*, 128*b*. In such an operative configuration the axially inner end portion of the two opposite lateral angular sectors 121*a*, 121*b* is also in radial abutment against the radially inner portion of the intermediate angular sector 111, thus counteracting the elastic thrust exerted on the intermediate angular sector 111 by the elastic element 113 and thus keeping the intermediate angular sector 111 in a position of radial contraction. In this way both the axial displacement of the lateral angular sectors 121*a*, 121*b* towards the middle plane M of the drum 100 and the radial expansion of the intermediate angular sector 111 are prevented. Such a radial expansion can, on the other hand, take place, as a result of the thrusting action exerted by the elastic element 113, because of the radial expansion of the lateral angular sectors 121*a*, 121*b*.

With reference to FIG. 2, each lateral angular sector 121*a*, 121*b* also comprises a radial blind hole 150*a*, 150*b* that is open at the radially inner surface thereof. The blind hole 150*a*, 150*b* houses, in a radially outer position, an elastic element 151*a*, 151*b* and, in a radially inner position, a pin 152*a*, 152*b*. The elastic element 151*a*, 151*b* thrusts the pin 152*a*, 152*b* in the radial direction towards the outside of the blind hole 150*a*, 150*b*.

Preferably, the elastic element 151*a*, 151*b* is a compression spring.

In the operative configurations of the drum 100 shown in FIGS. 2-6 and 8, the pin 152*a*, 152*b* is misaligned with respect to (or outside of) the hole 123*a'*, 123*b'*; therefore, the free end radially inner portion of the pin 152*a*, 152*b* abuts against the radially outer surface of the support body 122, which thus exerts a contrast action to the thrust exerted by the elastic element 151*a*, 151*b* on the pin 152*a*, 152*b*. In such operative configurations the lateral angular sector 121*a*, 121*b* is free to slide axially on the support body 122.

The axially outer end of each lateral angular sector 121*a*, 121*b* is pivoted at an end portion of a respective balancing lever 160*a*, 160*b*. The latter has, at an opposite free end portion thereof, a roller 161*a*, 161*b* which can rotate about a rotation axis perpendicular to the axial and radial directions of the drum 100.

The roller 161*a*, 161*b* is arranged in a radially inner position with respect to the contrast ring 200*a*, 200*b*. Such a roller 161*a*, 161*b* is intended to abut on the contrast ring 200*a*, 200*b* when the lateral angular sector 121*a*, 121*b* is in a condition of maximum expansion (FIG. 7).

During looping, each lever 160*a*, 160*b* rotates about two axially outer pivots formed in the support body 122, moving the lateral angular sectors 121*a* and 121*b* apart from one another until the pins 152*a* and 152*b*, as a result of the thrust exerted by the elastic element 151*a*, 151*b*, go inside the holes 123*a* and 123*b*. Such a specific configuration is indicated in FIG. 7 with the following string of reference numerals: 152*a*=123*a'*, 152*b*=123*b'*.

The two lateral angular sectors 121*a* and 121*b* are thus locked in an axially distal position with respect to the middle plane M of the drum 100; this position ensures no interference between the contact elements 127*a*, 127*b* with the loop 5 turned up on the annular anchoring structure 10, during the contraction of the drum 100. Such a specific configuration is indicated in FIG. 7 with the following string of reference numerals: 152*a*=123*a'*, 152*b*=123*b'*.

Each assembly comprising the elastic element 151*a*, 151*b*, the pin 152*a*, 152*b*, the hole 123*a'*, 123*b'*, the balancing lever 160*a*, 160*b* and the contrast ring 200*a*, 200*b* defines, in the drum 100, a respective assembly for stopping the axial movement of a respective lateral angular sector 121*a*, 121*b* with respect to the support body 122. Such a locking assembly is active in the operative configuration of the drum 100 shown in FIG. 7, corresponding to a condition of maximum expansion of the drum 100.

The axial movement of each lateral angular sector 121*a*, 121*b* with respect to the support body 122 is once again possible when, starting from the operative configuration of FIG. 7, after the radial contraction of the support body 122 the spigot 125*a*, 125*b* expels the pin 152*a*, 152*b* from the hole 123*a'*, 123*b'*, in this way reaching the operative configuration shown in FIG. 8.

Each assembly comprising the elastic element 151*a*, 151*b*, the pin 152*a*, 152*b*, the hole 123*a'*, 123*b'* and the spigot 125*a*, 125*b* defines, in the drum 100, a respective unlocking assembly for unlocking the axial movement of a respective lateral angular sector 121*a*, 121*b* with respect to the support body 122.

A preferred embodiment of a process for looping annular anchoring structures 10 in a process for building tyres for vehicle wheels will now be described. Such a process can be carried out using the drum 100 described above.

Initially, the drum 100 is in a configuration of maximum radial contraction, shown in FIG. 1.

The drum 100 is thus radially expanded up to reach an operating diameter that is selected depending on a fitting diameter of a tyre to be built.

Such a radial expansion is achieved as a result of the synchronous and simultaneous radial movement of the intermediate angular sectors 111 and of the lateral angular sectors 121*a*, 121*b*. This occurs following a rotation of the screw 102. Such a rotation produces a synchronous axial displacement of the lead nuts 146*a*, 146*b* towards one another and, as a result of the consequent displacement of the levers 140*a*, 140*b*, a synchronous radial displacement apart from one another (i.e. in a radially outward direction) of the support bodies 122*a*, 122*b* and therefore of the lateral angular sectors 121*a*, 121*b* associated with them. Such a synchronous radial displacement in turn allows the synchronous radial displacement apart from one another of the intermediate angular sectors 111 as a result of the elastic thrust exerted by the elastic element 113.

The drum 100 is at this point set in rotation about the longitudinal axis X-X by a suitable control device. During such a rotation, the screw 102 is decoupled from the drum and does not rotate, so as to prevent the drum 100 from expanding or contracting radially any further.

During the rotation of the drum 100 the loop 5 is deposited flat on the radially outer surface of the lateral angular sectors 121*a*, 121*b* and of the intermediate angular sectors 111 (FIG. 2).

At the end of the deposition of the loop 5 the end edge 5*a* of the loop is positioned on at least part of each lateral angular sector 121*a*, the end edge 5*b* of the loop 5 is positioned on at least part of each lateral angular sector 121*b* and an intermediate portion of the loop 5 is positioned on each intermediate angular sector 111. Preferably, the position of the loop 5 is asymmetrical with respect to the middle plane M of the drum 100.

At this point, the transfer member 500 carries an annular anchoring structure 10 in a radially outer position with respect to the intermediate portion of the radially outer annular surface of the loop 5 (FIG. 3). The transfer member 500 holds the annular anchoring structure 10 at a lateral surface of the substantially circumferential annular insert 11, for example as a result of a magnetic attraction or by suction.

The annular anchoring structure 10 is carried by the transfer member 500 in a centred position with respect to the middle plane M of the drum 100 and is held in such a position while the drum 100 is radially expanded. Such an expansion proceeds until the drum 100 exerts a predetermined radial thrust on the radially inner surface of the annular anchoring structure 10. The radial expansion of the drum 100 is achieved as a result of the synchronous radial movement of the lateral angular sectors 121a, 121b and of the intermediate angular sectors 111, as described above.

Figure 4:
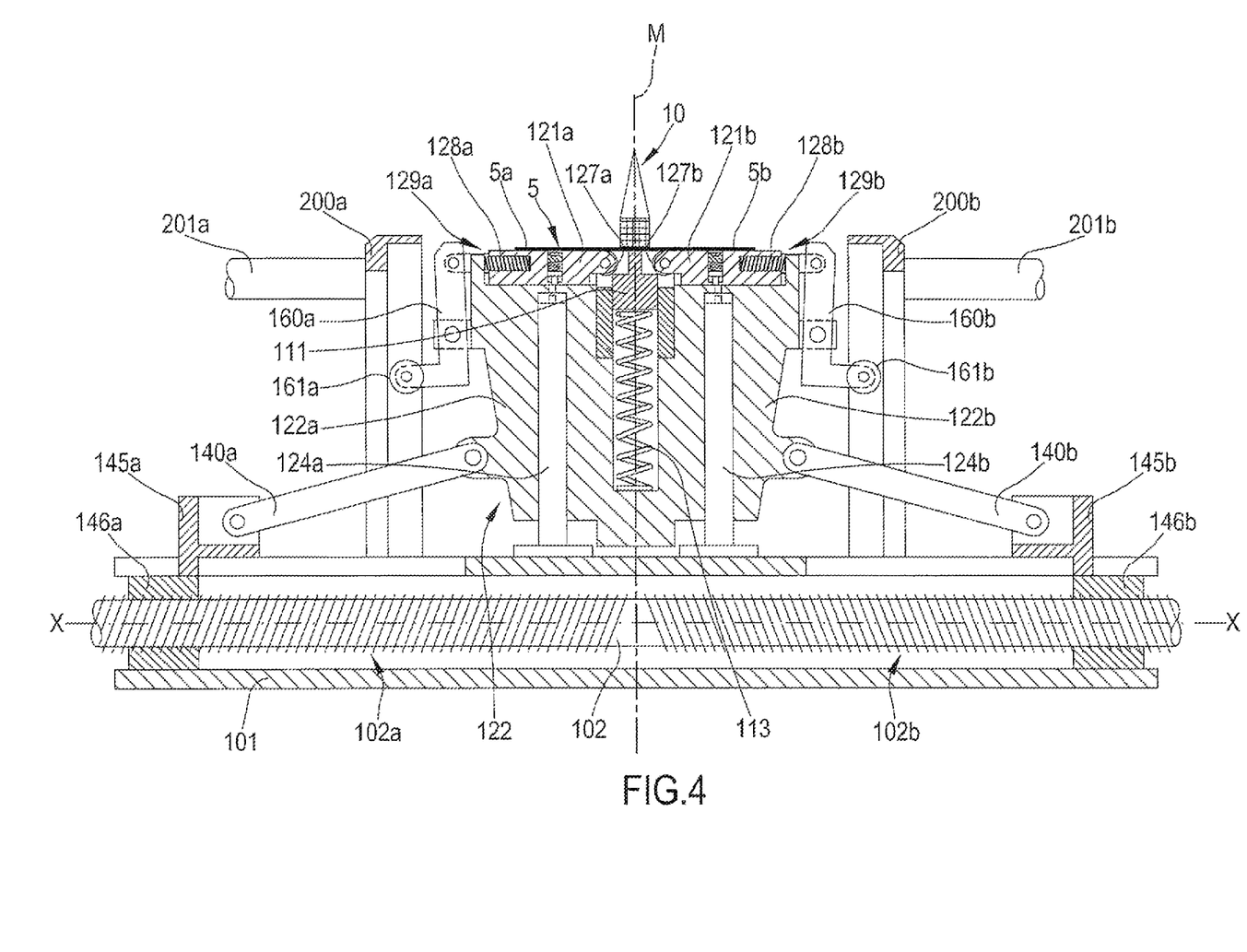
FIG. 4 is a schematic partial section view of the portion of drum of FIG. 1 in an operative configuration subsequent to that of FIG. 3.

At this point the transfer member 500 leaves the annular anchoring structure 10 and the turning up of the end edges 5a, 5b on the opposite lateral surfaces of the annular anchoring structure 10 can begin (FIGS. 4-6). Such a turning up is achieved as a result of the radial expansion of only the lateral annular portions 120a, 120b of the drum 100 and of the simultaneous synchronous axial movement of the lateral angular sectors 121a, 121b.

The radial expansion of the lateral annular portions 120a, 120b is obtained as a result of the synchronous radial movement of only the lateral angular sectors 121a, 121b.

The synchronous radial movement of the lateral angular sectors 121a, 121b is obtained as described above.

The radial movement of the intermediate angular sectors 111, on the other hand, is prevented by the radial contrast force exerted by the annular anchoring structure 10 against the elastic thrust of the elastic element 113, which contracts (FIGS. 5 and 6).

The simultaneous synchronous axial movement of the lateral angular sectors 121a, 121b is obtained, while the lateral angular sectors 121a, 121b radially displace outwards, as a result of the axial thrust exerted by the elastic element 128a, 128b against the annular anchoring structure 10.

During the radial movement and the simultaneous axial movement of the lateral angular sectors 121a, 121b, the contact elements 127a, 127b thrust the end edges 5a, 5b of the loop 5 against the lateral surfaces of the annular anchoring structure 10, until the operative configuration shown in FIG. 6 is reached, in which the annular anchoring structure 10 is completely surrounded by the loop 5. A reinforced annular anchoring structure 15 is thus obtained.

A further synchronous radial movement of the lateral angular sectors 121a, 121b is at this point prevented by the contact between rollers 161a, 161b and respective contrast rings 200a, 200b. In particular, the radial thrust of the rollers 161a, 161b on the contrast rings 200a, 200b causes a rolling of the rollers 161a, 161b on the radially inner surface of the contrast rings 200a, 200b, a consequent displacement of the balancing levers 160a, 160b and a consequent axial displacement of the lateral angular sectors 121a, 121b away from the reinforced annular anchoring structure 15, overcoming the elastic thrust exerted by the elastic elements 128a, 128b.

During such axial displacement the pins 152a, 152b of the lateral angular sectors 121a, 121b, thrusted by the respective elastic elements 151a, 151b, slide on the radially outer surface of the support body 122 until the operative configuration shown in FIG. 7 is reached, in which the pins 152a, 152b go inside the holes 123a', 123b', preventing any further axial displacement of the lateral angular sectors 121a, 121b.

At this point the direction of rotation of the screw 102 is reversed, thus obtaining a radial contraction of the lateral annular portions 120a, 120b of the drum 100 as a result of the synchronous radial movement of the lateral angular sectors 121a, 121b in a radially inward direction.

The aforementioned radial contraction proceeds until the spigots 125a, 125b provided on the guide bars 124a, 124b thrust the pins 152a, 152b out from the holes 123a', 123b' and the lateral angular sectors 121a, 121b are pushed once again by the respective elastic elements 128a, 128b towards the middle plane M of the drum 100.

Thereafter, the transfer member 500 picks the reinforced annular anchoring structure 15 up and the drum 100 is contracted until the operative configuration shown in FIG. 8 is reached. Such a radial contraction is produced by a further radial movement of the lateral angular sectors 121a, 121b in a radially inward direction and, from the time when the latter go into radial abutment on the intermediate angular sectors 111, from a simultaneous radial movement of the intermediate angular sectors 111 in a radially inward direction.

The transfer member 500 can thus withdraw the reinforced annular anchoring structure 15 from the drum 100, which is thus ready to proceed with the looping of another annular anchoring structure according to the process described above.

The Applicant estimates for the entire looping process described above a cycle time of about 40-50 seconds.

Of course, a man skilled in the art can bring further modifications and variants to the invention described above in order to satisfy specific and contingent application requirements, said variants and modifications in any case being within the scope of protection as defined by the following claims.

The invention claimed is:

1. A process for looping annular anchoring structures in a process for building tyres for vehicle wheels, comprising:
   depositing a loop on a drum comprising a radially expandable/contractible intermediate annular portion and, in a position axially adjacent to opposite axial ends of said intermediate annular portion, a pair of radially expandable/contractible lateral annular portions;
   associating an annular anchoring structure with a radially outer annular surface portion of said loop defined at said intermediate annular portion; and
   turning up each of opposite end edges of said loop on said annular anchoring structure as a result of a thrusting stress imparted by a respective lateral annular portion of said pair of lateral annular portions because of a synchronous radial movement and a synchronous axial displacement of a respective plurality of circumferentially adjacent first angular sectors;
   wherein during the turning up, the annular anchoring structure is not rotated.

2. The process according to claim 1, wherein said axial displacement is carried out simultaneously with said radial movement.

3. The process according to claim 1, comprising, before depositing said loop, radially expanding at least said intermediate annular portion up to reach an operating diameter that is selected depending on a fitting diameter of a tyre to be built.

4. The process according to claim 3, wherein the radial expansion of at least said intermediate annular portion is carried out simultaneously with at least part of the radial movement of said first angular sectors.

5. The process according to claim 3, wherein the radial expansion of at least said intermediate annular portion is achieved as a result of the synchronous radial movement of a plurality of circumferentially adjacent second angular sectors.

6. The process according to claim 5, wherein the radial movement of each of said second angular sectors is obtained as a result of an elastic thrust exerted on each of said second angular sectors.

7. The process according to claim 1, wherein associating said annular anchoring structure comprises:
   positioning said annular anchoring structure in a radially outer position with respect to said loop at said intermediate annular portion; and
   radially expanding at least said intermediate annular portion until a radial thrust is exerted on a radially inner surface of said annular anchoring structure.

8. The process according to claim 7, wherein said radial thrust is an elastic thrust.

9. The process according to claim 1, comprising, at the end of the turning up of said opposite end edges of said loop, axially moving said first angular sectors away from said annular anchoring structure.

10. The process according to claim 9, comprising locking said first angular sectors in a distal axial position with respect to said annular anchoring structure.

11. The process according to claim 10, comprising radially contracting said first angular sectors after said first angular sectors are locked at said distal axial position.

12. The process according to claim 11, comprising, at the end of the radial contraction of said first angular sectors, unlocking said first angular sectors from said distal axial position.

13. The process according to claim 1, wherein an axial elastic thrust is exerted on each of said first angular sectors to achieve an axial displacement thereof towards a middle plane of the drum.

* * * * *